United States Patent
Rockefeller et al.

(10) Patent No.: US 7,688,203 B2
(45) Date of Patent: Mar. 30, 2010

(54) SURVEILLANCE DEVICE BY USE OF DIGITAL CAMERAS LINKED TO A CELLULAR OR WIRELESS TELEPHONE

(76) Inventors: Alfred Gerhold Rockefeller, 30 Cobblestone La., Ramsey, NJ (US) 07446-2457; A. Zeki Erdin, 887 Franklin Lakes Rd., Franklin Lakes, NJ (US) 07417-2115

( * ) Notice: Subject to any disclaimer, the term of this patent is extended or adjusted under 35 U.S.C. 154(b) by 406 days.

(21) Appl. No.: 11/650,387

(22) Filed: Jan. 5, 2007

(65) Prior Publication Data
US 2007/0159323 A1    Jul. 12, 2007

Related U.S. Application Data

(60) Provisional application No. 60/758,140, filed on Jan. 12, 2006.

(51) Int. Cl.
*G08B 13/00* (2006.01)
(52) U.S. Cl. .................................... 340/541
(58) Field of Classification Search ............. 340/541, 340/539.17, 539.14, 426.1; 455/344, 404.1
See application file for complete search history.

(56) References Cited

U.S. PATENT DOCUMENTS

| 5,056,056 A | * | 10/1991 | Gustin | ......................... | 702/187 |
| 6,956,599 B2 | * | 10/2005 | Lim et al. | ................. | 348/14.02 |
| 7,460,655 B2 | * | 12/2008 | Fujisawa et al. | ....... | 379/106.01 |
| 2003/0117280 A1 | * | 6/2003 | Prehn | ......................... | 340/540 |
| 2004/0095236 A1 | * | 5/2004 | Sobol | ......................... | 340/506 |
| 2007/0099163 A1 | * | 5/2007 | Tseng | ......................... | 434/350 |

* cited by examiner

*Primary Examiner*—Phung Nguyen

(57) ABSTRACT

This invention satisfies a need for surveillance of any fixed or mobile location from a 4G wireless terminal or cellular telephone equipped to view video. The surveillance device consists of digital video cameras, microphones and alarms interfacing a control unit which has the ability to time stamp and store all camera outputs on a storage device, recognize alarms, send alarm status to a remote wireless user, receive wireless calls from the remote user and act on remote commands to transmit any camera output occurring during a time period selected by the remote user. The latter will enable the remote user to document video and sound for a time interval of interest. Video and sound of this time interval may be placed in permanent storage for transfer to a portable video medium. This invention will employ the new 4G wireless network to allow a wireless terminal or telephone equipped with a video display to select the proper bandwidth needed to receive streaming video and sound from the remote surveillance device.

10 Claims, 4 Drawing Sheets

SURVEILLANCE DEVICE BY USE OF DIGITAL CAMERAS LINKED TO A CELLULAR OR WIRELESS TELEPHONE

Provisional Patent Application 60/758,140

CROSS REFERENCE TO RELATED APPLICATIONS

Application Number PCT/FI/03/00153

Video Surveillance Method, Video Surveillance System and Camera Application Module International Filing Date: 3 Mar. 2003

This application identifies the concept of a video surveillance system using video cameras linked through a camera application module to a terminal via a wireless connection. The camera application module mediates interchange of information and video data between the camera(s) and wireless connection which may be comprised of a fixed wireless terminal, an Email connection, or a cellular connection. The system may employ alarms relating to individual cameras An alarm will cause an alarm message to be sent to the wireless terminal via the application module. The camera will start and send frames at a rate which the radio path will allow. In the case of 2G (GSM and GPRS), the video will be compressed to accommodate the bandwidth of the radio path. Full speed streaming video is not contemplated in this application.

The system will also respond to a poll from the remote user terminal and will transmit video frames from a video camera selected by remote user command. In both cases the camera will start recording and transmitting after the triggering stimulus.

U.S. application Ser. No. 11/521,416

Exchange of Voice and Video Between Two Cellular or Wireless Telephones

National Filing Date: 15 Sep. 2006

This application defines the means of sending or exchanging streaming video and voice over a fourth generation wireless network based on IEEE Specification 802.16 for both fixed and mobile wireless subscribers.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

There is a prior patent application in which the stated objective is the definition of the means of surveillance using digital video cameras. In this case, the system is linked to a wireless, land line or Internet terminal using a radio link in lieu of hard wired connections. This application introduces the concept of a local alarm causing a local controller to start a camera and simultaneously initiate a wireless connection to a user. In this preceding case, the camera is inactive unless either an alarm or a call from a remote user occurs. This prior proposed system allows only stepped video frames or compressed video files to be sent. Streaming video is not contemplated because of lack of bandwidth in existing wireless facilities.

BRIEF SUMMARY OF THE INVENTION

This specification explains the requirements and method for implementation of a surveillance system which will allow transmission of streaming video and voice from the system to a remote cellular or wireless terminal. Such a system will employ digital video cameras running continuously and sending their output into a storage device via a controller. The storage device will hold a predetermined amount of output from each camera. When the storage capacity is reached, video will be overwritten from the beginning storage address. A wireless call from a remote user will cause the controller to send the output of any user selected camera, properly compressed for transmission, from the storage device to a wireless communication interface and thus to the remote user. An alarm will cause notification to be sent to the user via a wireless call and a text message. The user may then call the surveillance system and sample various camera outputs along with sound. The user may retrieve video from the storage device to allow him to see events prior to triggering of the alarm. Since streaming video exchange is not practical using existing 2G and 3G cellular networks because of network congestion problems, 4G network technology will be employed.

3.1 Shows a view of the left front side of the automobile.

3.2, 3.3, 3.4, 3.5 Show locations of digital video cameras.

3.6 Shows the outline of the surveillance device concealed in the automobile trunk.

3.7 Shows wireless antenna. Location of the antenna may be in any convenient exterior location.

Figure 1:
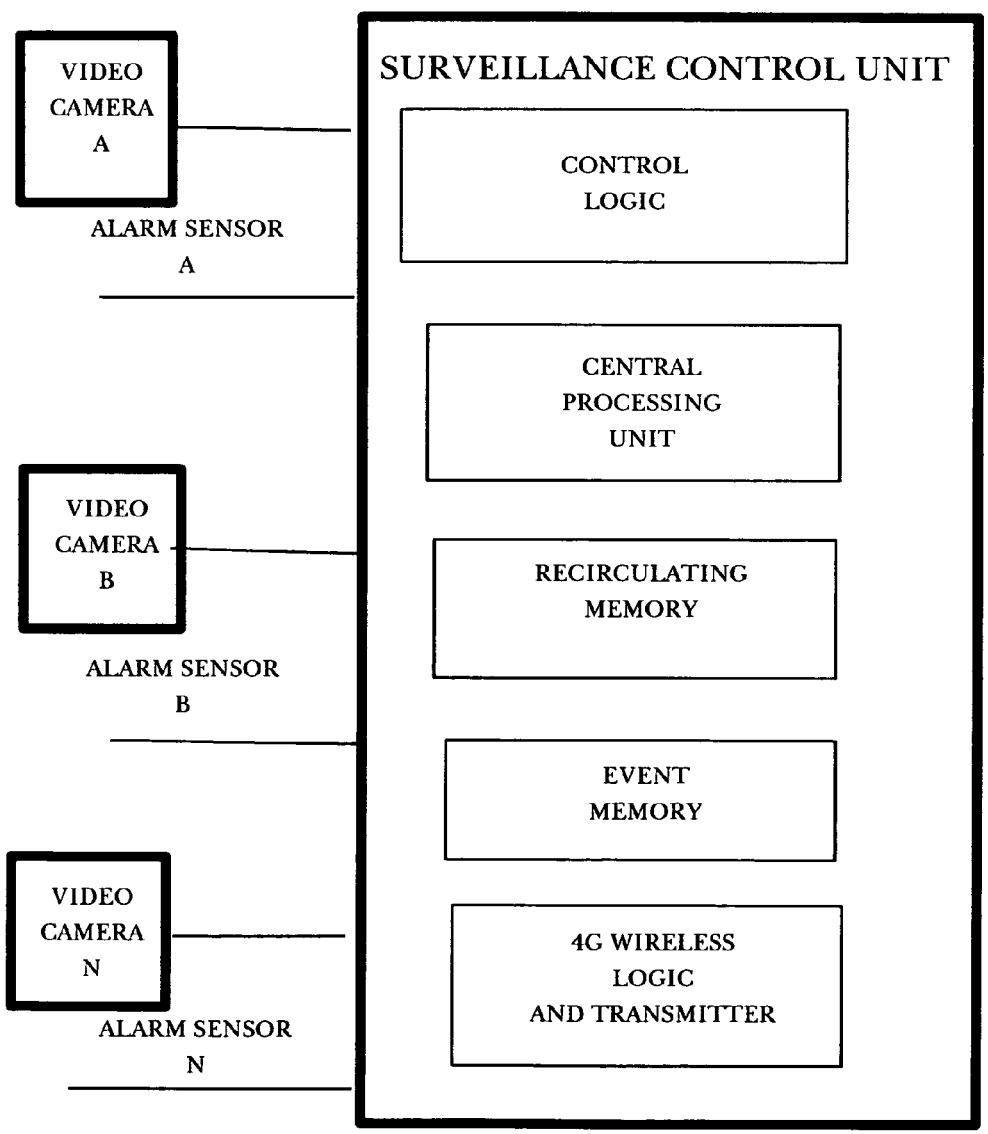
FIG. 1 represents a block diagram of the Surveillance Control Unit showing video camera and alarm sensor inputs. Exchange of data with the remote wireless user is done through the block labeled "4G Wireless Logic and Transmitter".
Figure 2:
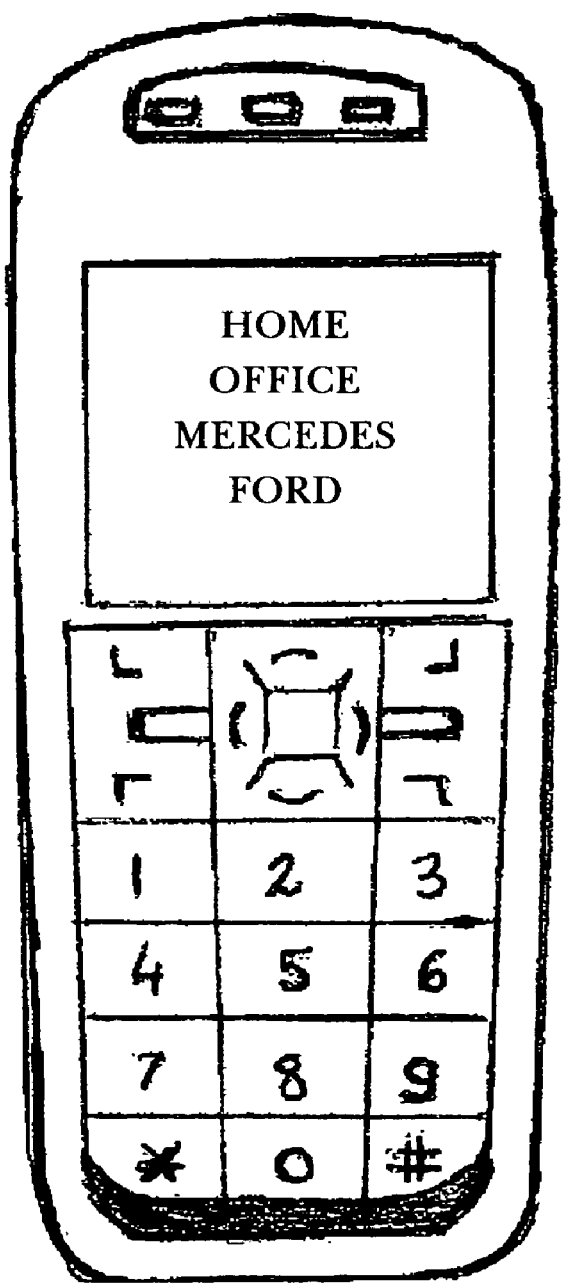
FIG. 2 depicts a cellular telephone equipped with the ability to receive streaming video and sound over a 4G connection. The telephone display shows the list of surveillance points which may be selected.
Figure 3:
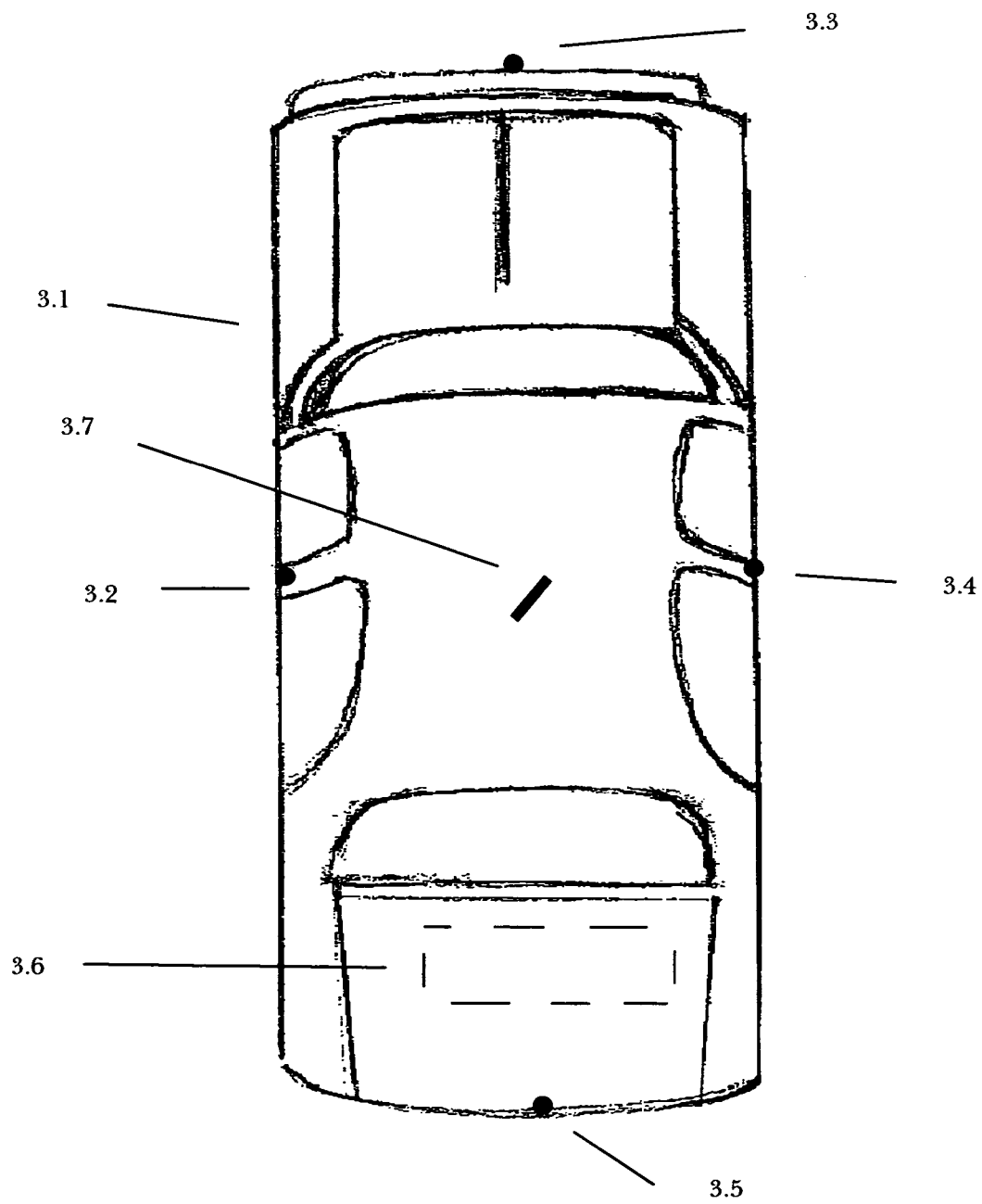
FIG. 3 shows an aerial view of an automobile equipped with the surveillance device.
Figure 4:
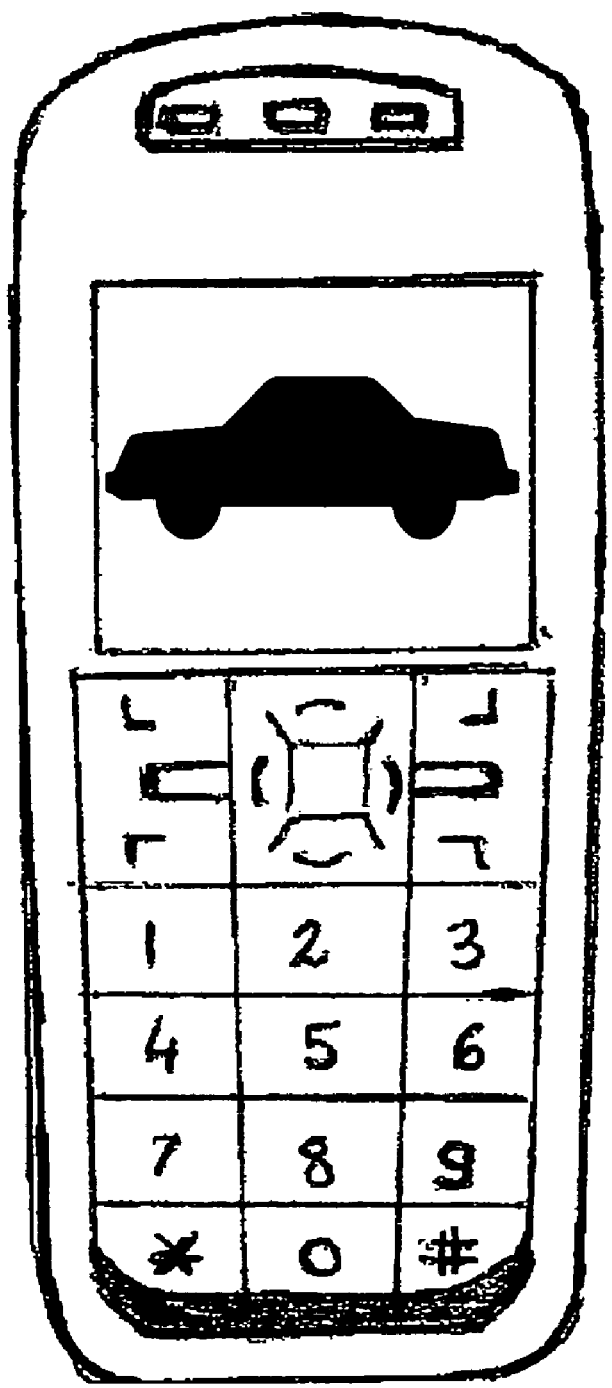

FIG. 4 depicts surveillance video of an automobile from any fixed or mobile surveillance location.

DETAILED DESCRIPTION OF THE INVENTION

The present wireless networks are configured for either cellular voice use (2g and 3G) or for higher speed data including downloads from the Internet, video downloads and music downloads. The three latter are being achieved by use of new broadband wireless networks such as UMTS and EV-DO which are base on third generation CDMA technology. These broadband networks are separate and distinct from voice networks. All existing broadband networks employ 2G or 3G technology. The new surveillance system will communicate both sound and video using wireless networks including both long range fixed and mobile wireless communication using new technology to achieve greater bandwidth. An example of this is OFDMA (Orthogonal Frequency Division Multiple Access) technology which will allow dynamic bandwidth allocation so that a single network may carry voice, video, Internet download and high speed data. The IEEE 802.16 series of specifications provides the building blocks for creation of a new interconnected fixed and mobile network which will replace the existing voice and broadband wireless networks with one (4G) network.

The ongoing rollout of 4G networks based on IEEE Specification 802.16 (a-n) will make possible the exchange of voice and text as well as broadband data on a single network. Both fixed and mobile subscribers will be served and potentially interconnected.

The proposed surveillance system will employ digital cameras interfacing a control unit. The camera interfaces may be hard wired or employ local wireless interfaces. Microphones associated with each camera will be similarly interfaced with the control unit. Various alarms adjacent to cameras will be monitored by the system and cause the system to notify a remote user of an alarm condition via a text message to hid wireless terminal.

The control unit will have the following functions:

Capture the video and sound outputs from each camera and microphone location and store these separate outputs continuously on non-volatile memory. There will be sufficient memory to capture video and sound for an extended period after which the storage will begin at the initial address, overwriting the old data.

Mark each video input with a time and date stamp.

Monitor the alarm inputs. In case of an alarm, compose and send a text message to the remote subscriber informing him of the alarm status, date/time and camera location.

Upon receipt of a call from the remote subscriber, await the selection of a camera. After camera selection, retrieve current video and sound from memory storage and send video and sound to the originator.

Monitor the remote subscriber connection for selection of video and sound prior to and after the alarm condition. The subscriber may select increments of time of one to several minutes.

The subscriber may select an interval prior to, including and post alarm output. This output range will be stored in a separate non-volatile event memory for later retrieval and conversion to a permanent storage medium outside of the surveillance system.

The originating wireless terminal will automatically configure itself to a speaker phone mode upon exercising of the surveillance option.

Selection of the surveillance option on the originating terminal will be table driven. Each user's wireless terminal will contain a list of his surveillance locations. All entities in the individual user's surveillance group will be displayed on a table. Each surveillance option table entry will be associated with a routing table which contains the selection number of the surveillance unit, a Class of Service code and an appropriate CDMA BW request code (IEEE 802.16).

Exercising the table entry and pressing the "call" button will cause the originating subscriber terminal to select the 4G network and send the CDMA BW request code. The CDMA BW request code will signal the network to assign the proper bandwidth Implementation of network configuration will be acknowledged by the network. The terminal will then send selection and the Class of Service Code. The Class of Service code for a surveillance entity will cause the network to access an alternate "caller ID" database in which the originator is identified as a surveillance subscriber for billing purposes. The alternate surveillance "caller ID" will contain a terminating class of service code which will be downloaded to the surveillance device as part of the "caller ID" package after call routing. Receipt of the class of service code by the surveillance device will confirm the call as a surveillance call and not a wrong number.

The surveillance system will answer the call through the integrated wireless terminal. After call connect, the surveillance system will ask for a password to ensure that loss or theft of the originator's wireless terminal will not allow access to the surveillance system by illicit users.

After connection is achieved, the originator will be able to select a table which will allow selection of an appropriate camera site (listed, for example, as "kitchen", "back yard", etc. Selection of a particular camera site on the camera site table will select a camera code sequence to be sent to the surveillance device. This will cause video from that site to be forwarded to the originator. Keypad functions will allow the originator to select a window of recording time from the camera output he is observing. This window may contain video and sound both before and after the initiation of the call. Video camera output and sound obtained during this window may be stored in an "Event Memory" for later retrieval.

Alarms will be communicated to the remote user via text message sent over a wireless connection initiated by the surveillance device.

Terminals may be configured to support the surveillance option on various transmission facilities which may be integrated with the new 4G network. These will include mobile broadband wireless networks, "wireless city" networks (including "Hot spot" interfaces with 802.11) and "wireless city" networks interconnected with other "wireless city" networks by satellite link or fiber optic link. Interconnection of mobile and stationary wireless terminals into one network will allow users to employ various paths to interrogate a surveillance device.

Because of direct linkage of the surveillance device to the subscriber over the 4G network, the device is not tied to a land line or Internet connection and thus may be installed in both fixed and mobile locations such as trains and motor vehicles.

The invention claimed is:

1. A portable, mobile fourth generation wireless video surveillance device comprising a controller, one or more alarm sensors, one or more alarm status indicators, one or more digital video cameras, a recirculating non volatile storage memory, a non volatile event memory, a 4G (802.16) wireless network subscriber interface and a remote 4G (802.16) cellular or wireless terminal or 4G (802.16) cellular telephone equipped with both a video display and subscriber table software to allow the cellular telephone or the cellular or wireless terminal to instruct the 4G Network Base Station to set up the communication channel for the appropriate bandwidth to support streaming video, wherein the transfer of video from the recirculating memory to the event memory is preset to include video recorded prior to and after the time of triggering of the alarm sensor to identify perpetrators and show the sequence of events prior to and following the triggering of the alarm.

2. The portable, mobile fourth generation wireless video surveillance device of claim 1, wherein the device is used at a fixed or mobile location (i.e. buildings, automobiles, trains, airplanes, outdoors) wherever a power source is available.

3. The portable, mobile, fourth generation wireless video surveillance device of claim 1, wherein one or more digital video cameras record continuous video of an area or areas which contain an alarm sensor paired with each digital video camera and the digital video outputs are individually stored on the recirculating non volatile memory.

4. The portable, mobile, fourth generation wireless video surveillance device of claim 1, wherein the triggering of an alarm sensor by an intruder or by an event selected from the group containing impact and fire and water intrusion communicates an alarm status to the controller via the alarm status indicator paired with the alarm sensor.

5. The portable, mobile fourth generation wireless video surveillance device of claim 1 wherein communication of an alarm status paired with a particular video camera to the controller causes the controller to transfer video obtained from the particular video camera to the event memory from the recirculating memory.

6. A portable, mobile fourth generation wireless video surveillance device comprising a controller, one or more alarm sensors, one or more alarm status indicators, one or more digital video cameras, a recirculating non volatile storage memory, a non volatile event memory, a 4G (802.16) wireless network subscriber interface and a remote 4G (802.16) cellular or wireless terminal or 4G (802.16) cellular telephone equipped with both a video display and subscriber table software to allow the cellular telephone or the cellular or wireless terminal to instruct the 4G Network Base Station to set up the communication channel for the appropriate bandwidth to support streaming video, wherein the triggering of an alarm causes the controller to send a text message to the remote cellular or wireless subscriber address via the fourth generation wireless network interface informing the remote cellular or wireless subscriber of the alarm event, time of alarm and video camera location, wherein the remote cellular or wireless subscriber responds to the alarm text message by selecting from the remote cellular or wireless subscriber terminal software table the cellular address of the alarm device location and initiating a call.

7. The portable, mobile, fourth generation wireless video surveillance device of claim 6 wherein the remote cellular or wireless subscriber terminal will, after call initiation, instruct the 4G wireless base station to set the communication channel bandwidth to support streaming video.

8. The portable, mobile, fourth generation wireless video surveillance device of claim 6 wherein, after call connect, the subscriber uses in-band signaling via cellular phone or qwerty keys on a cellular terminal to interrogate the surveillance device controller via the 4G wireless network and the 4G wireless network interface.

9. The portable, mobile, fourth generation wireless video surveillance device of claim 6 wherein the subscriber selects the video of the alarmed location from the event memory which is preset to show video of events from prior to the alarm to after the alarm.

10. The portable, mobile, fourth generation wireless video surveillance device of claim 6 wherein the subscriber selects the video optionally from any non-alarmed camera location in which case the recirculating memory supplies the video.

* * * * *